United States Patent
Johannessen (10) Patent No.: US 9,725,033 B1
(45) Date of Patent: Aug. 8, 2017

(54) METHOD AND SYSTEM FOR DISPLAYING A MOVEABLE LIGHTING SCENE IN A PASSENGER CABIN

(71) Applicant: B/E AEROSPACE, INC., Wellington, FL (US)

(72) Inventor: Eric Johannessen, Holbrook, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/288,744

(22) Filed: Oct. 7, 2016

Related U.S. Application Data (60) Provisional application No. 62/306,821, filed on Mar. 11, 2016.

(51) Int. Cl.
| | |
|---|---|
| *H05B 37/02* | (2006.01) |
| *B60Q 3/02* | (2006.01) |
| *B64D 11/00* | (2006.01) |
| *B64D 47/02* | (2006.01) |
| *F21S 4/22* | (2016.01) |
| *F21Y 115/10* | (2016.01) |

(52) U.S. Cl.
CPC .......... *B60Q 3/0293* (2013.01); *B64D 11/00* (2013.01); *B64D 47/02* (2013.01); *H05B 37/0227* (2013.01); *F21S 4/22* (2016.01); *F21Y 2115/10* (2016.08)

(58) Field of Classification Search
CPC .... H05B 37/02; H05B 37/0227; H05B 33/08; F21S 4/22; B60Q 3/0293; B64D 11/00; B64D 47/02; F21Y 2115/10
USPC .................................... 315/77–82, 291, 307
See application file for complete search history.

(56) References Cited

U.S. PATENT DOCUMENTS

| | | |
|---|---|---|
| 5,677,603 A | 10/1997 | Speirs et al. |
| 2004/0135522 A1 | 7/2004 | Berman et al. |
| 2004/0217234 A1 | 11/2004 | Jones et al. |
| 2011/0254445 A1 | 10/2011 | Bachhuber |
| 2015/0170604 A1 | 6/2015 | Iwagaki et al. |
| 2016/0353551 A1* | 12/2016 | Despres .............. F21V 23/0471 |

OTHER PUBLICATIONS

PCT Search Report and Written Opinion issued in related application PCT/US2016/056292, Dec. 16, 2016, 9 pages.

* cited by examiner

*Primary Examiner* — Jimmy Vu
(74) *Attorney, Agent, or Firm* — Drinker Biddle & Reath LLP (57) ABSTRACT

The present disclosure is generally directed to an interior lighting system for an aircraft, in which individual lighting elements (or groups of lighting elements) can be controlled to emit light of various colors and brightness according to the position of a cart, such as a galley cart. According to an embodiment, a processor that controls the system receives signals from one or more sensors around the aircraft cabin (e.g., radio frequency identification ("RFID") readers or optical scanners) that indicate the current position of the cart (e.g., by detecting an RFID tag on the cart) and, based on the position of the cart, sends commands to the various lighting elements around the cabin to execute a lighting scene (e.g., gradually raise the lights as the cart comes through).

20 Claims, 9 Drawing Sheets

METHOD AND SYSTEM FOR DISPLAYING A MOVEABLE LIGHTING SCENE IN A PASSENGER CABIN

CROSS-REFERENCE TO RELATED APPLICATIONS

This application claims the priority benefit of U.S. Provisional Application No. 62/306,821, filed Mar. 11, 2016, which is incorporated herein by reference in its entirety.

TECHNICAL FIELD

The present disclosure relates generally to passenger cabin lighting and, more particularly, to a passenger cabin lighting system that displays a lighting scene that is moveable and a method for displaying a moveable lighting scene in a passenger cabin.

BACKGROUND

Cabin lighting can greatly impact the travel experience of passengers (e.g., the in-flight experience of airline passengers). Consequently, a carrier can differentiate itself from its competitors by incorporating unique and upscale lighting features into its fleet.

DRAWINGS

While the appended claims set forth the features of the present techniques with particularity, these techniques, together with their objects and advantages, may be best understood from the following detailed description taken in conjunction with the accompanying drawings of which:

DESCRIPTION

The present disclosure is generally directed to an interior lighting system for an aircraft, in which individual lighting elements (or groups of lighting elements) can be controlled to emit light of various colors and brightness according to the position of a cart, such as a galley cart. According to an embodiment, a processor that controls the system receives signals from one or more sensors around the aircraft cabin (e.g., radio frequency identification ("RFID") readers or optical scanners) that indicate the current position of the cart (e.g., by detecting an RFID tag on the cart) and, based on the position of the cart, sends commands to the various lighting elements around the cabin to execute a lighting scene (e.g., gradually raise the lights as the cart comes through).

Figure 1A:
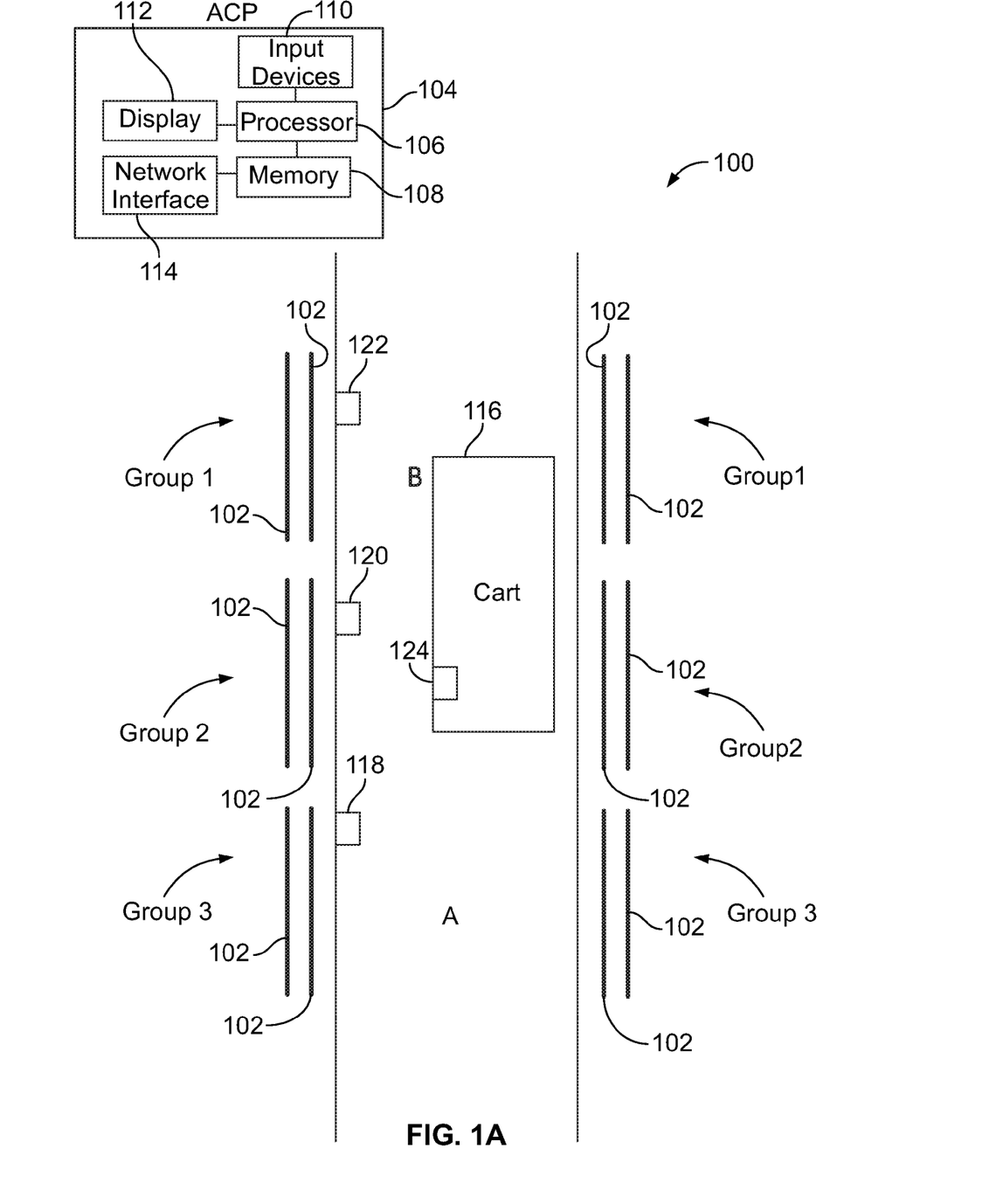
FIG. 1A is a block diagram of a lighting system according to an embodiment.

Turning to FIG. 1A, a lighting system 100 configured according to an embodiment is shown. The system 100 is depicted as being deployed in a passenger cabin of an aircraft. The system 100 includes multiple lighting elements 102 and an attendant control panel ("ACP") 104. The ACP 104 allows a person, such as flight attendant, to interact with the system 100 in order to, for example, control the lighting elements 102. The ACP 104 includes a hardware processor 106 ("processor 106") (e.g., a microprocessor or controller, or application-specific integrated circuit), a memory 108 (e.g., volatile or non-volatile memory, random-access memory), user input devices 110 (e.g., switches, buttons, keyboard, mouse, or touchscreen), a display 112 (e.g., an organic, light-emitting diode display), and a network interface 114 (which may be wired or wireless). The display 112 may include one or more of the user input devices 110 (e.g., a touchscreen). The processor 106 is communicatively linked to the lighting elements 102 via the network interface 114 (e.g., by wired connection). Also deployed within the cabin is a cart 116 (e.g., a galley cart).

In an embodiment, the system 100 also includes one or more devices within the cabin 102 that are communicatively linked to the processor 106 and are capable of reporting to the processor 106 the presence of the cart 116. There may be any number of such devices, but for the sake of clarity three such devices 118, 120, and 122 are depicted in FIG. 1. The devices 118, 120, and 122 may be implemented as, for example, infrared sensors, radio frequency receivers, or ("RFID") readers. The cart 115 includes a device 124 that is capable of communicating with the devices 118, 120, and 122. The device 124 may be implemented as, for example, a beacon (e.g., an infrared transmitter or low power radio frequency transmitter) or passive devices, such as an RFID tage. For purposes of illustration, the device 124 will be referred to hereinafter as an RFID tag 124. The RFID tag 124 is located such that when the cart 116 passes by the device 118, 120, or 122, the device reads the RFID tag 124 and transmits a signal to the processor 106. Other possible implementations of the devices 118, 120, and 122 include an optical detector (e.g., a scanner) that reads a pattern (e.g., bar code) on the cart 116 when the cart 116 passes by (in which case an RFID tag would not be necessary).

According to an embodiment, each lighting element 102 is a line replaceable unit ("LRU"). Possible implementations of a lighting element is depicted in, and described with reference to FIGS. 4A-4H. Other possible implementations of a lighting element include, for example, a reading light or an accent light (e.g., a flexible accent light).

In an embodiment, each lighting element 102 is separately addressable by the processor 106.

According to an embodiment, the lighting elements 102 are organized into groups. There may be any number of groups but, for the sake of clarity, three groups are depicted in FIG. 1A—Group 1, Group 2, and Group 3—and each group is separately addressable by the processor 106.

Figure 1B:
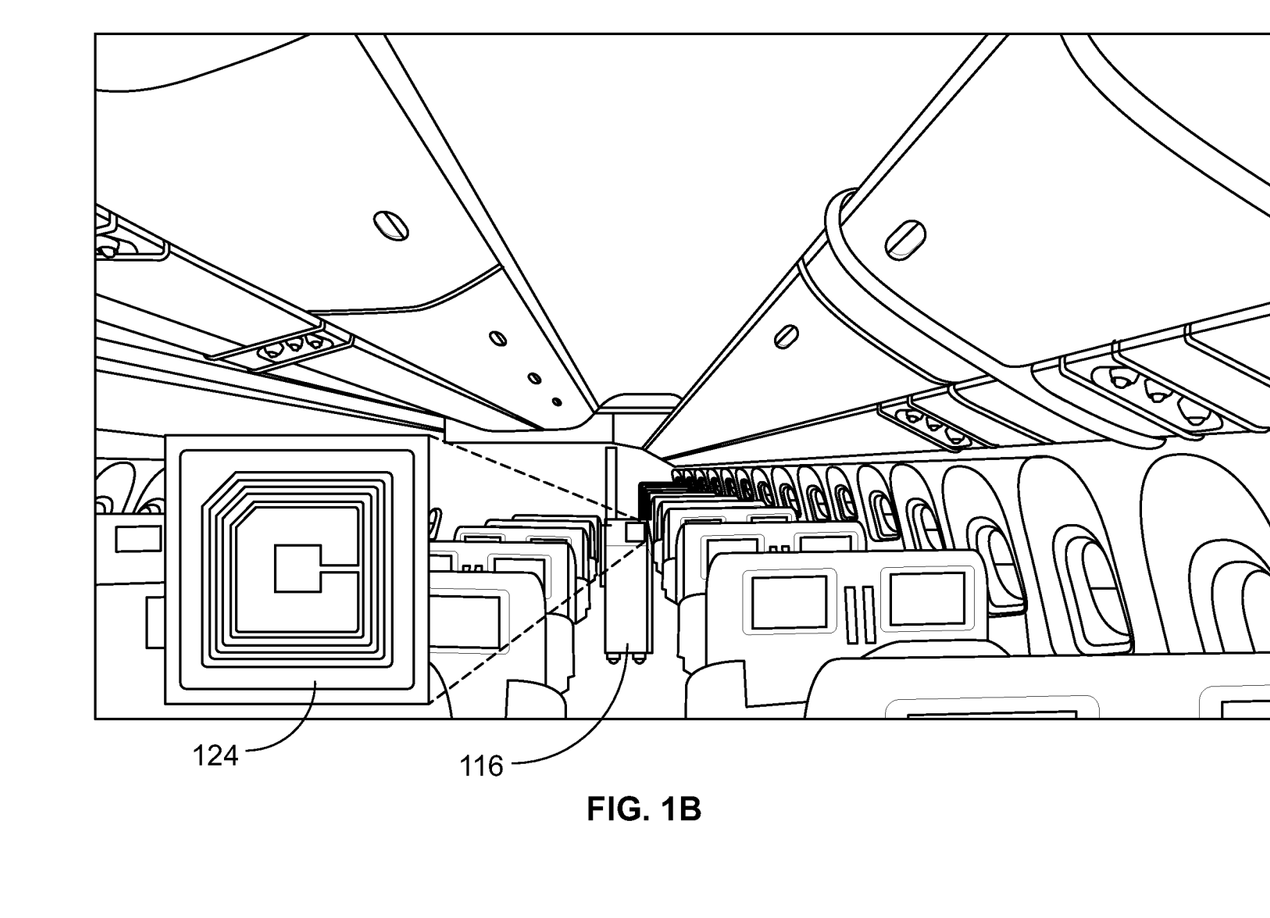
FIG. 1B is an artistic rendering of the lighting system of FIG. 1A deployed in an aircraft passenger cabin according to an embodiment.

FIG. 1B is an artistic rendering of the lighting system of FIG. 1A deployed in an aircraft passenger cabin according to an embodiment. The RFID tag 124 is shown in a magnified view.

Figure 2:
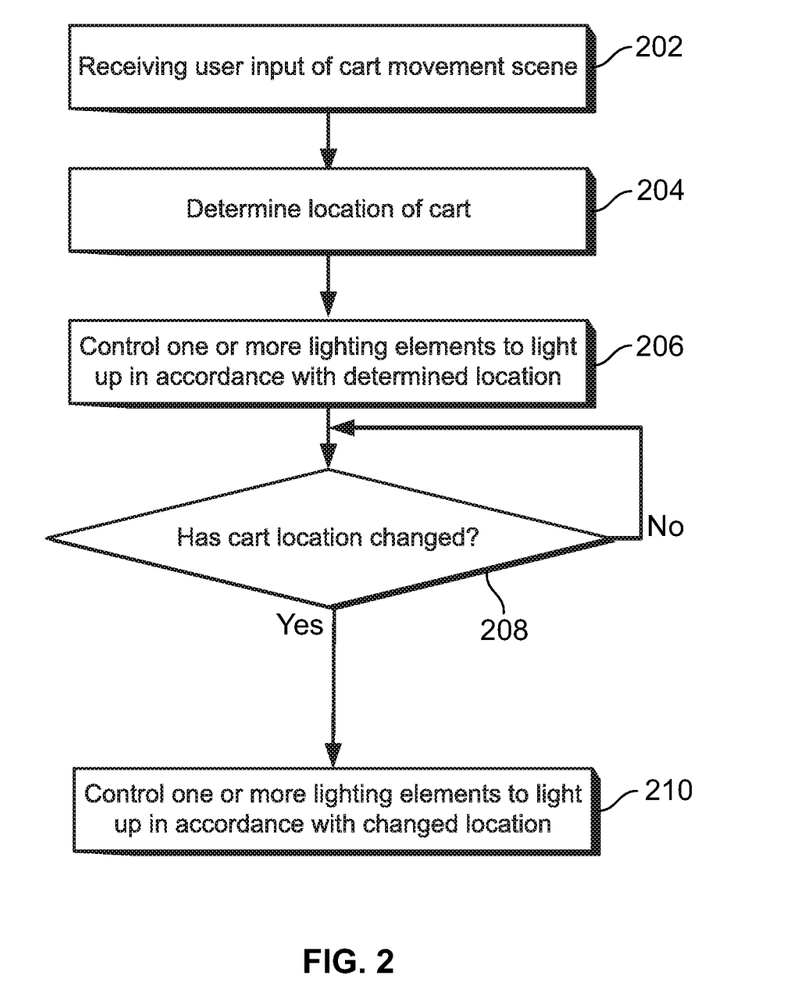
FIG. 2 depicts a process carried out according to an embodiment.

Turning to FIG. 2, a method that may be carried out according to an embodiment will now be described. At block 202, the processor 106 receives input from a user, such as a flight attendant, via a graphical user interface of the display 112 of the ACP 104. The input represents the user's selection of a mode in which the lighting elements 102 light up or dim in coordination with the movement of a cart 116 (e.g., a galley cart). At block 204, the processor 106 determines the location of the cart 116 (e.g., by reading the status of the devices 118, 120, and 122, such as by polling or passively monitoring). At block 206, the processor 106 controls one or more of the lighting elements 102 to light up in accordance with the determined location of the cart 116. For example, the processor 106 may control the lighting elements in the vicinity of the cart 116 to light up with one or more colors in a pattern that gives the impression of a sunrise in the cabin 102 immediately in front of the cart 116. At block 208, if the processor 106 determines that the location of the cart 116 has changed (e.g., based on, for example, ceasing to receive a signal from the device 118 and starting to receive a signal from the device 120), then the processor 106 controls one or more of the lighting elements 102 to change its lighting state based on the new location of the cart 116. For example, if the cart 116 moves from location A (of FIG. 1A) to location B, then the processor 106 might transmit commands to Group 2 to operate in the "sunrise scene" mode. In some implementations, the processor 106 may control one or more of the lighting elements 102 to change their state when the cart 116 leaves their vicinity. In other implementations, the processor 106 may control one or more of the lighting elements 102 to remain in the same state even after the cart 116 leaves the vicinity. For example, if the cart 116 is being brought out during breakfast, the processor 106 could control Group 3 to display the "sunrise scene" as the cart 116 passes near device 118, control Group 2 to display the sunrise scene as the cart 116 passes near device 120 and either leave Group 3 in the sunrise scene mode as the cart 116 moves away from the device 118 or cause Group 1 to operate in a different mode as the cart 116 moves away. The scene may be system level and include both cabin lights and, for example, reading lights and accent lights.

Figure 3A:
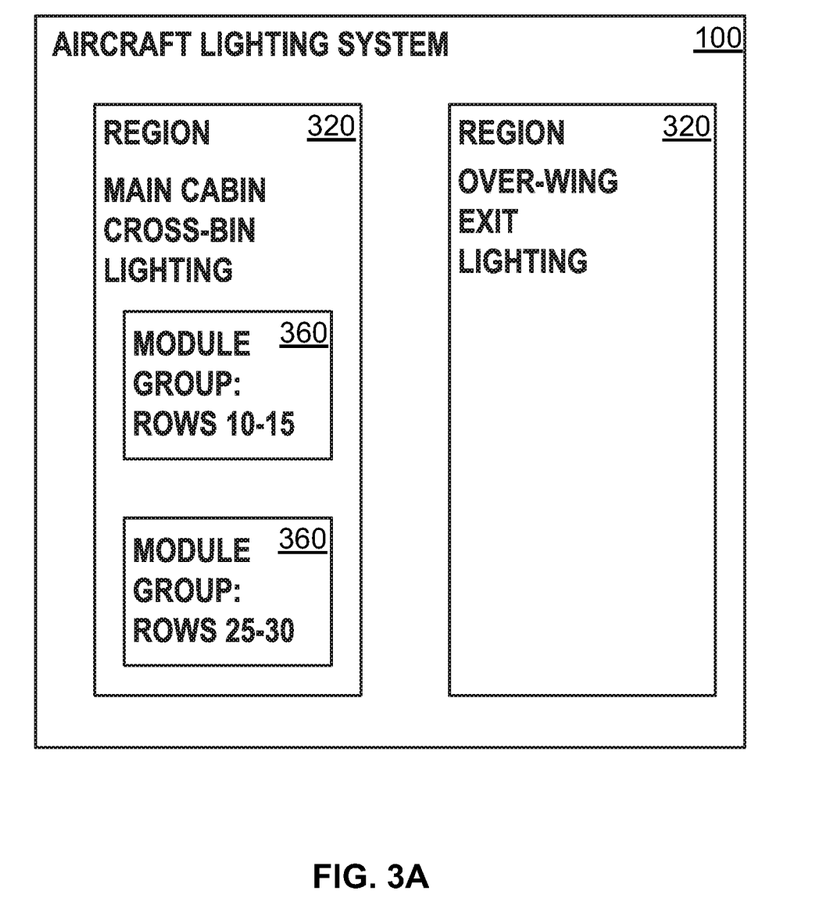
FIGS. 3A-3D depict different aspects of the lighting system according to various embodiments.

Turning to FIG. 3A, an example of how the lighting elements 102 of the lighting system 100 may be organized in an embodiment will now be described. The lighting system 100 may be broken down into different addressable lighting regions (or zones) 320 that could be used on an aircraft. For example, the regions on an aircraft could include: sidewall lighting, cross-bin lighting, over wing exit lighting, ceiling lighting, direct lighting, etc.

In an embodiment, there are one or more lighting module groups 360 within each of these regions 320. These module groups 360 may be implemented as LRUs to allow for quick assembly, maintenance, and replacement. For example, one module group 360 could be for the main cabin cross-bin lighting for rows 10-15.

Figure 3B:
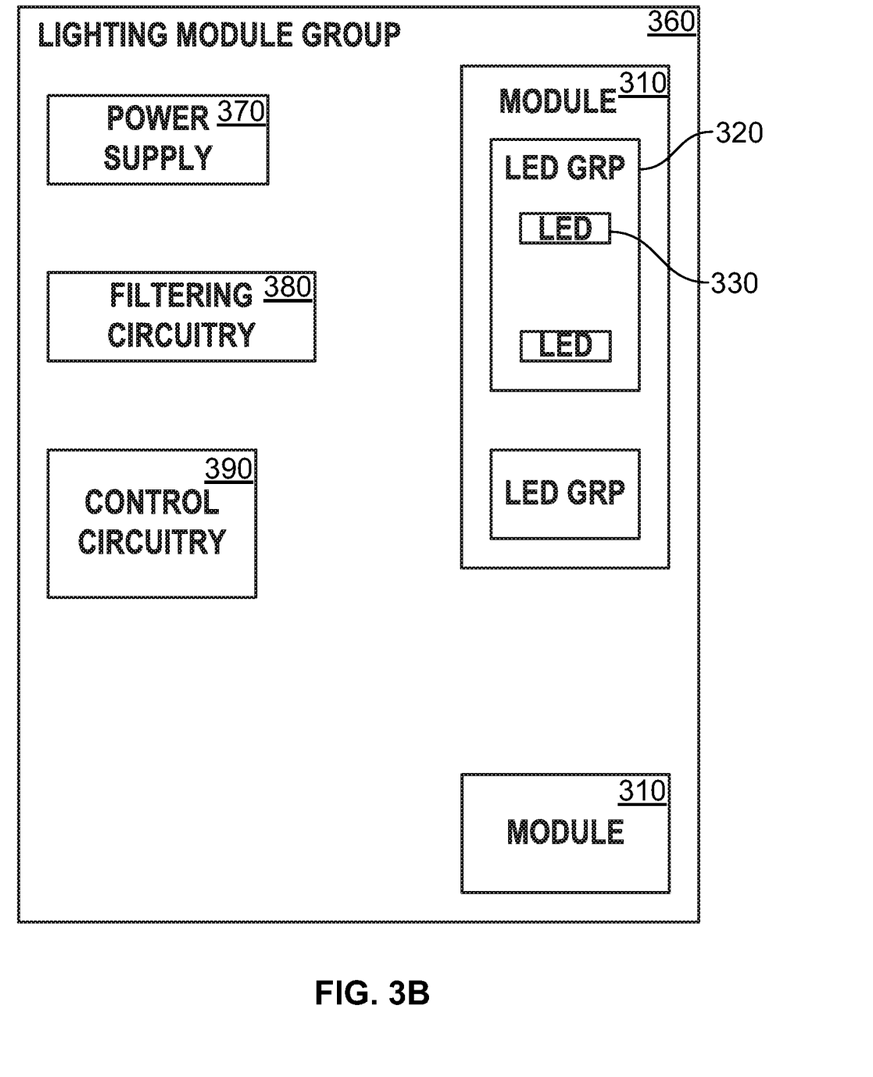

Turning to FIG. 3B, an example of how a lighting group 360 may be organized according to an embodiment is described. Each module group 360 includes one or more lighting modules 310, each of which includes multiple LEDs 330 that may be organized into LED groups 320. Note that an individual LED 330 could belong to more than one group 320. For example, an LED 330 could be part of one group based on having a common manufacturer, and could part of another group based on its color.

In an embodiment, each module 310 includes one or more of the following: a) control circuitry 390 for controlling the module and possibly other attached slave modules 310 in a group 360; b) power supply 370 to permit an LED washlight to function off of, e.g., a 115 VAC, 400 HZ power source; and c) filtering circuitry 380 to filter incoming power to the modules and ensure that no problematic harmonic emissions, spikes or other undesirable power conditions are introduced back onto the aircraft power bus.

The LEDs 330 within a module may be controlled individually, within specific groups 320 of LED within a module, or collectively (all LEDs in a module). Each group 320 may include an arbitrary number of LEDs. LEDs may be grouped according a variety of possible criteria, including area zones, color, and LED characteristics.

Figure 3C:
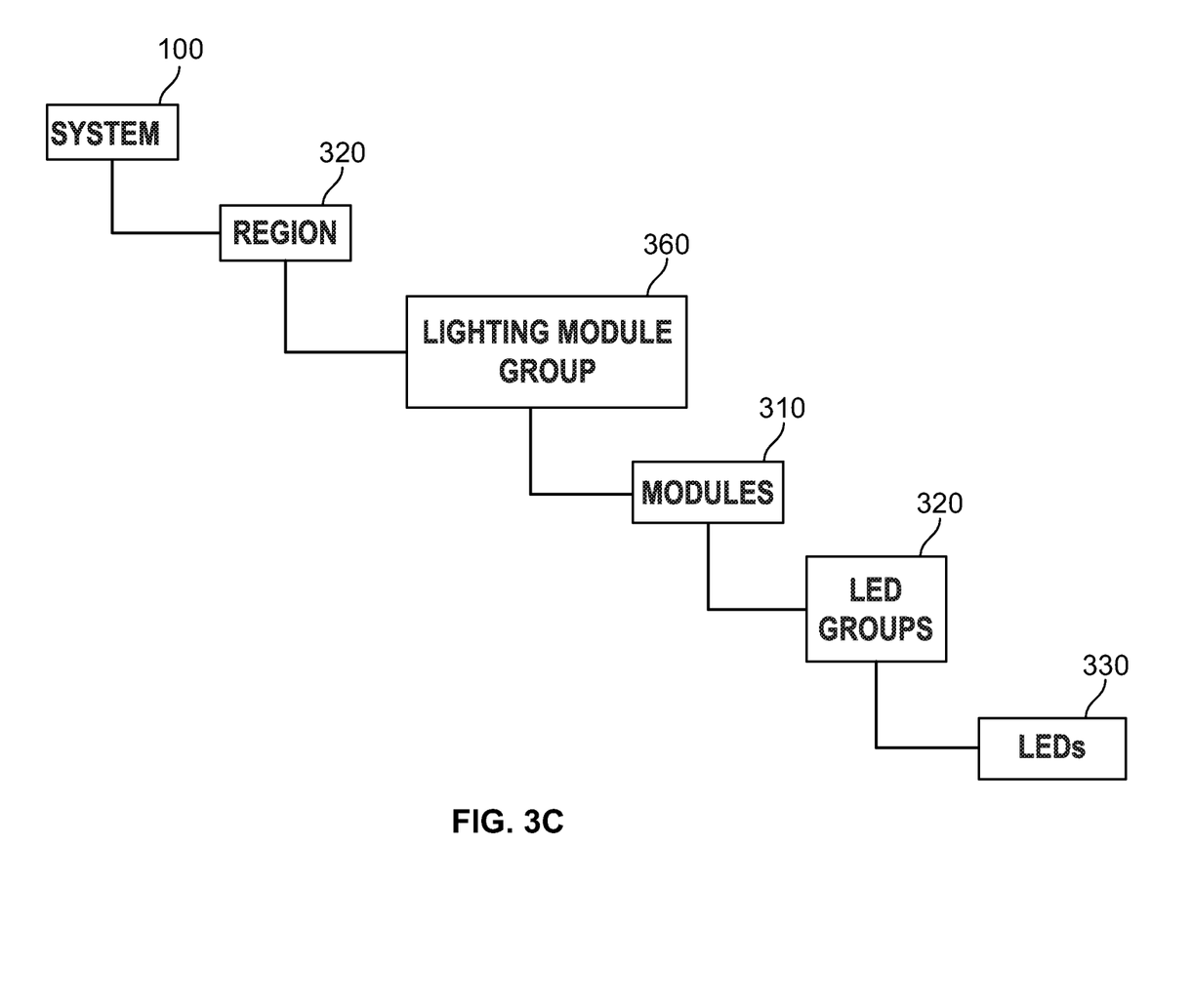
Figure 3D:
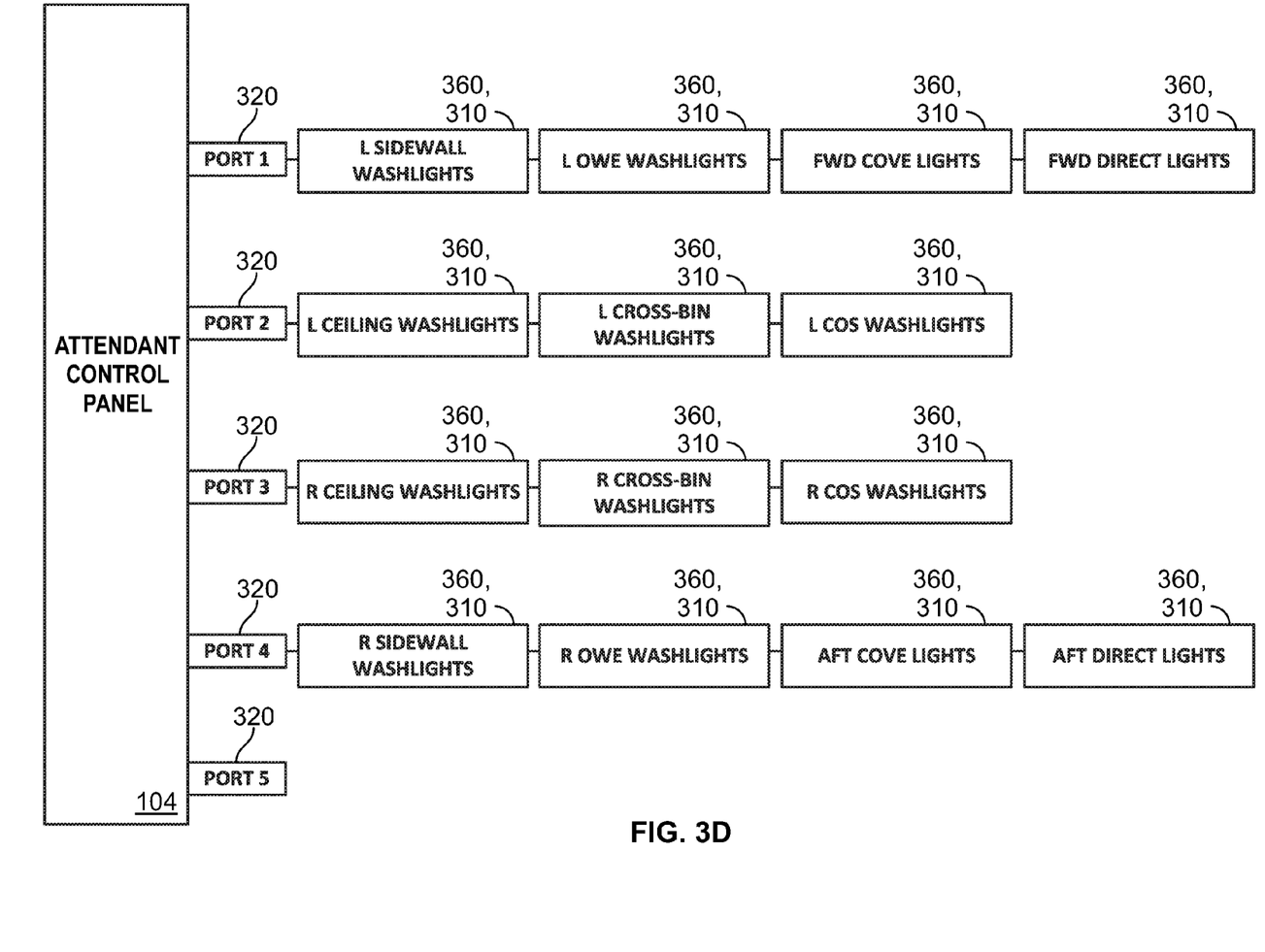

FIG. 3C shows the overall hierarchical structure according to an embodiment. FIG. 3D another possible configuration, showing the ACP 104 (and, consequently, the processor 106) connected to a number of regional lighting configurations 320. The ACP 104 can communicate via ports, such as an RS-485 port, or a networking port using, e.g., Ethernet, TCP/IP, etc. FIG. 3C shows that the different lighting components can be lighting module groups 360 or individual lighting modules 310 themselves (which could also be construed as a module group 360 having a single lighting module 310).

Figures 4A, 4B, 4C:
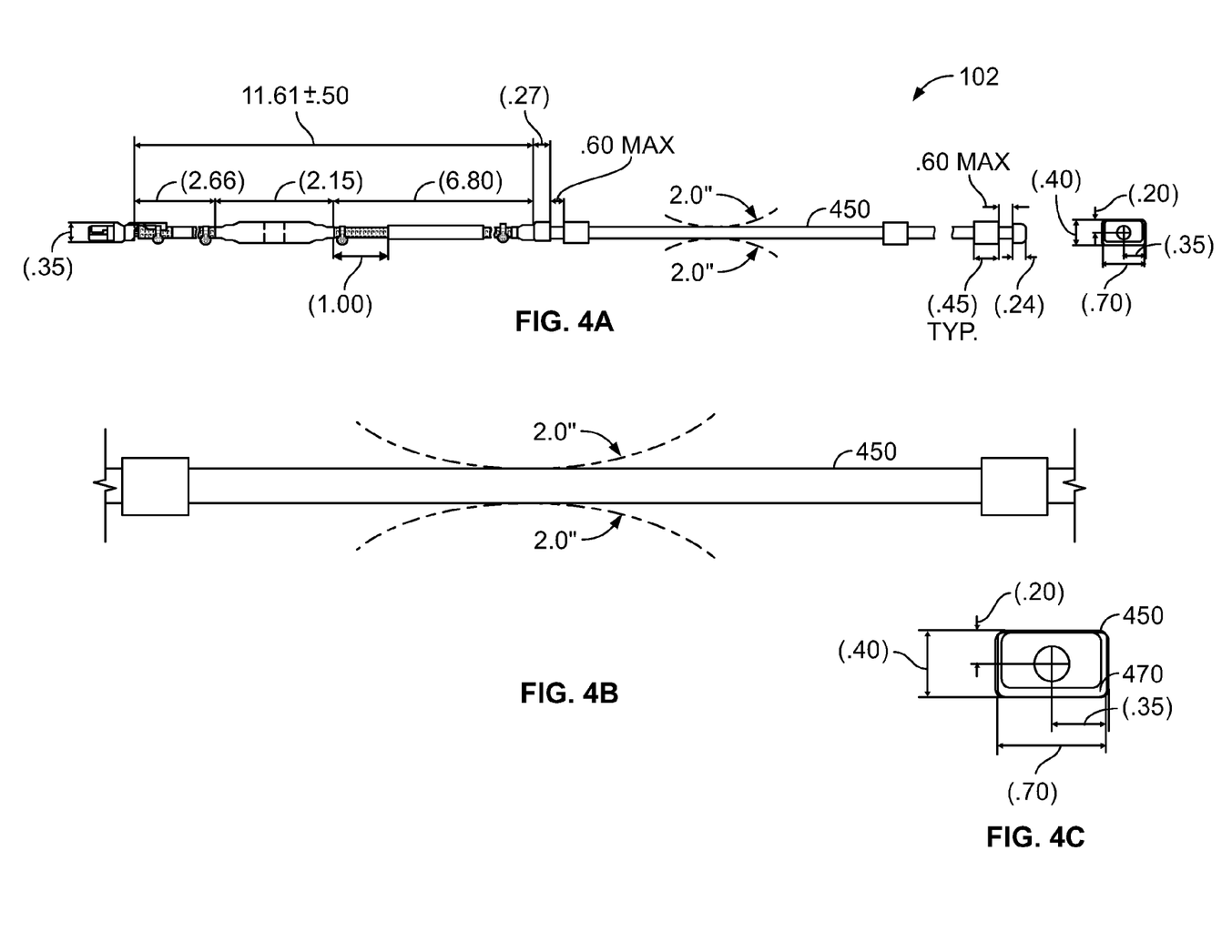
FIGS. 4A-4H depict various implementations of a lighting element according to various embodiments.

Turning to FIGS. 4A-4C, a possible implementation of a lighting element 102 is shown. The lighting element 102 in this embodiment includes a flexible LED module 450 along with supporting cables, connectors, and the like. FIG. 4B illustrates a bending radius for the LED module 450 as being approximately 2.0" in a direction along a U-shaped channel of the module 450—in other words, the upper arms of the U are upright and pointing towards the top in FIG. 4B. The flexible nature of the LED module 450 is due to the use of a flexible PCB with flexible traces on it, combined with a flexible housing 470. FIG. 4C is a cross-section of the module 450 and shows the flexible housing 470 along with example dimensions (inches).

Figures 4D, 4E, 4F, 4G, 4H:
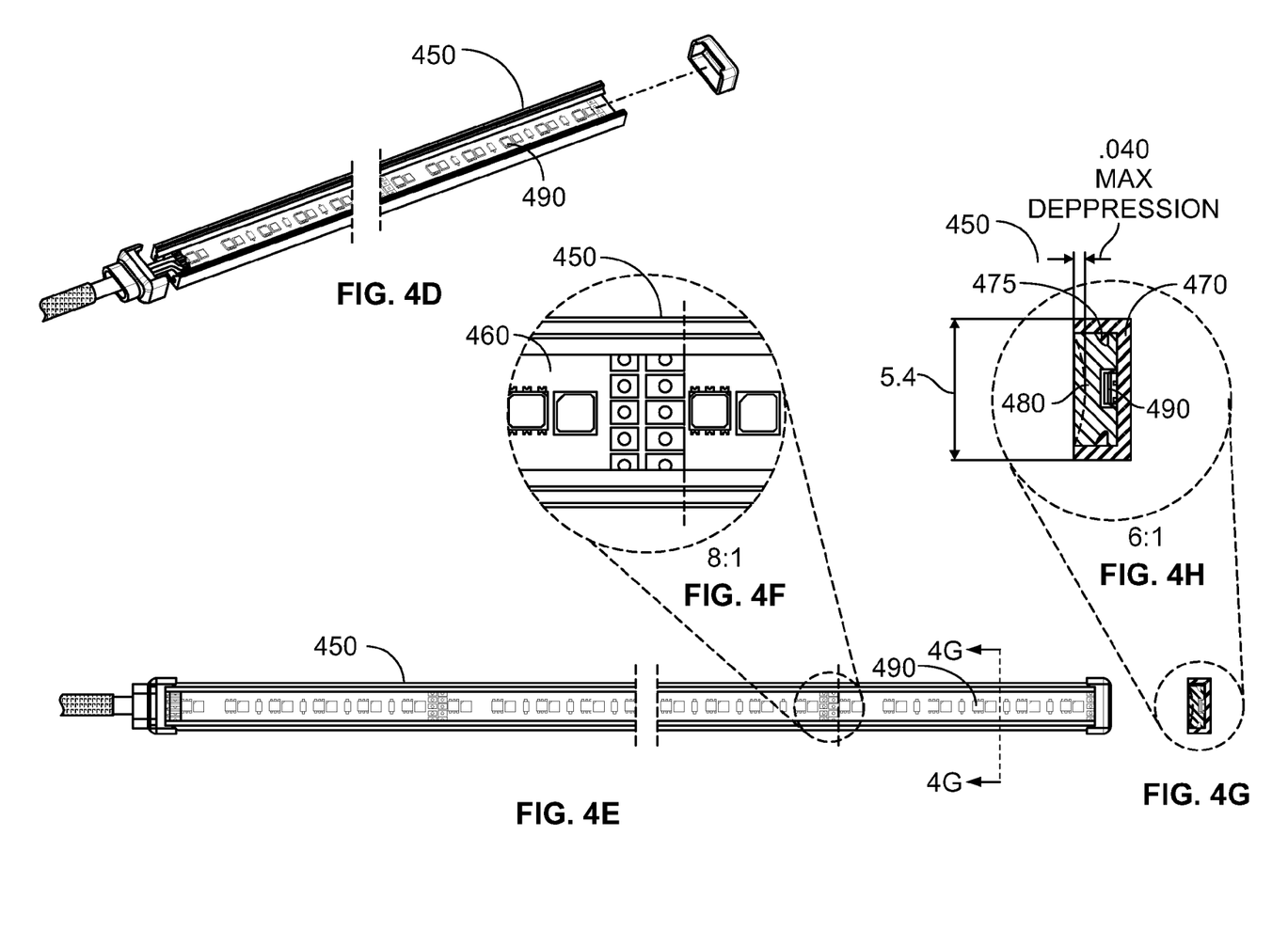

FIG. 4D is a perspective view and FIG. 4E is a plan view showing in more detail the LED module 450 with multiple LED units 490 on them. FIG. 4F is a plan detail view showing the circuitry mounted on a flexible PCB 460 of the LED module 450. The LEDs 490 in the module 450 may be densely spaced, e.g., on 0.5" intervals, in order to maximize the amount of light output.

FIG. 4G is a cross-section G-G of the LED module 450 shown in FIG. 4E, and FIG. 4H is a detailed view of this cross-section. The flexible housing 470 is shown in more detail and may or may not include protrusions 475 in the side walls that hold in a flexible encapsulant 480 that may be based on, e.g., silicone. The flexible housing 470 is made of a flexible material, such as a known thermally conductive silicone. At a bottom portion of the housing's 470 U-shaped channel is the actual LED 490 itself.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope.

What is claimed is:

1. A method for displaying a moveable lighting scene in passenger cabin, the method comprising:
    receiving a signal from a sensor;
    determining the location of a cart within the passenger cabin based on the signal; and
    transmitting signals to control lighting within the passenger cabin based on the determined location.

2. The method of claim 1, wherein receiving a signal from the sensor comprises beginning to receiving the signal from the sensor after a period in which no signal had been received from the sensor, the method further comprising determining that, based on beginning to receive the signal from the sensor, the location of the cart has changed.

3. The method of claim 1, wherein the sensor is a second sensor, the method further comprising ceasing to receive a signal from a first sensor of the plurality and, based on the cessation of the signal from the first sensor and receiving the signal from the second sensor, determining that the location of the cart has changed.

4. The method of claim 1, wherein transmitting signals to control lighting in the passenger cabin comprises transmitting signals to control the lighting such that lights within the cabin light up as the cart approaches.

5. The method of claim 4, wherein the lights light up with a sunrise effect in the vicinity of the cart.

6. The method of claim 1, wherein the lighting comprises at least a first group of lights and a second group of lights, wherein determining the location of the cart comprises determining that the cart has moved from away from the first group of lights and near the second group of lights, the method further comprising:
based on the determination, cause the first group of lights to fade and the second group of lights to brighten.

7. The method of claim 1, further comprising receiving a selection of lighting mode via a control panel in the passenger cabin, wherein controlling the lighting comprises controlling the lighting in accordance with the selected lighting mode.

8. The method of claim 1, wherein receiving a signal from a sensor comprises receiving a signal from an infrared sensor that detects the presence of the cart.

9. The method of claim 1, wherein receiving a signal from a sensor comprises receiving a signal from a radio frequency sensor that detects the presence of the cart.

10. The method of claim 1, wherein receiving a signal from the sensor comprises receiving a signal from a radio frequency identification reader that reads a radio frequency identification chip on the cart.

11. The method of claim 1, wherein receiving a signal from the sensor comprises receiving a signal from sensor that optically senses the cart.

12. The method of claim 1, further comprising polling each of the plurality of sensors for data.

13. A system for displaying a movable lighting scene in a passenger cabin, the system comprising:
a hardware processor;
a plurality of lights;
a plurality of sensors located within the passenger cabin, wherein the hardware processor carries out actions comprising:
receiving a signal from a sensor of the plurality of sensors;
determining the location of a cart within the passenger cabin based on the signal; and
transmitting signals to control lighting within the passenger cabin based on the determined location.

14. The system of claim 13, wherein receiving a signal from the sensor comprises beginning to receiving the signal from the sensor after a period in which no signal had been received from the sensor, wherein the hardware processor carries out further actions comprising determining that, based on beginning to receive the signal from the sensor, the location of the cart has changed.

15. The system of claim 13, wherein the sensor is a second sensor, wherein the hardware processor carries out further actions comprising ceasing to receive a signal from a first sensor of the plurality and, based on the cessation of the signal from the first sensor and receiving the signal from the second sensor, determining that the location of the cart has changed.

16. The system of claim 13, wherein transmitting signals to control lighting in the passenger cabin comprises transmitting signals to control the lighting such that lights within the cabin light up as the cart approaches.

17. The system of claim 16, wherein the lights light up with a sunrise effect in the vicinity of the cart.

18. A system for displaying a movable lighting scene in a passenger cabin, the system comprising:
an attendant control panel that receives a selection of a cabin lighting mode;
a plurality of separately-addressable lighting groups;
a plurality of sensors located along a path of a galley cart, wherein at least one of the plurality of sensors detects the presence of the cart and, in response, transmits a signal;
a hardware processor that receives the signal from the sensor and, in response, controls a first group of the plurality of groups to either fade or brighten in accordance with the cabin lighting mode.

19. The system of claim 18, wherein, in response to receiving the signal, the hardware processor controls a second group of the plurality of groups to dim.

20. The method of claim 18, wherein the plurality of lighting groups comprises a first group of lights and a second group of lights, wherein the hardware processor determines, based on the signal received from the sensor, that the cart has moved from away from the first group of lights and closer to the second group of lights, and, in response to the determination, controls the first group of lights to fade and the second group of lights to brighten.

* * * * *